Nov. 3, 1959   R. P. J. TAPP   2,911,118
LOADING AND UNLOADING APPARATUS CARRIED BY VEHICLES
Filed Nov. 23, 1956   6 Sheets-Sheet 6
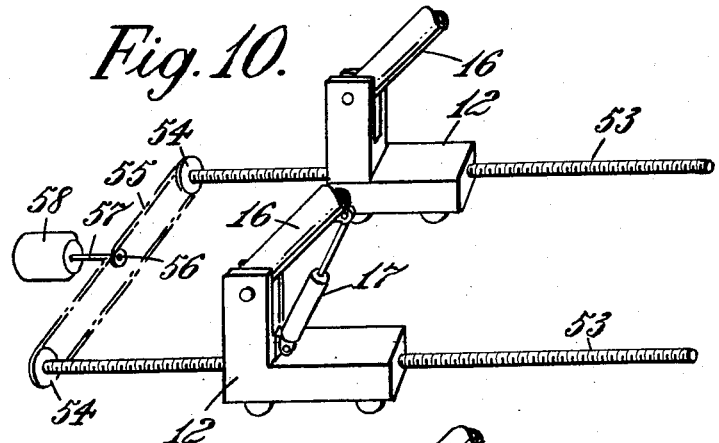
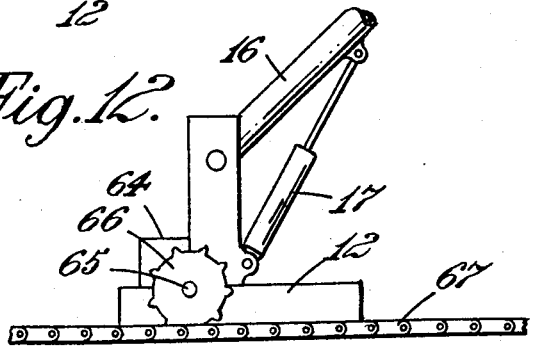
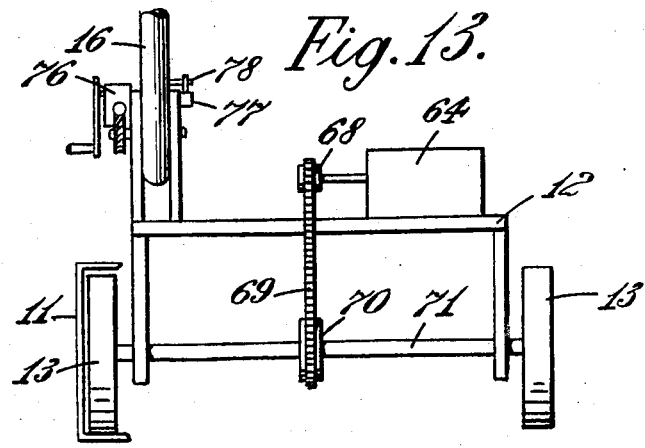
INVENTOR
RAYMOND PERCY JAMES
TAPP
By Irwin S. Thompson
ATTY.

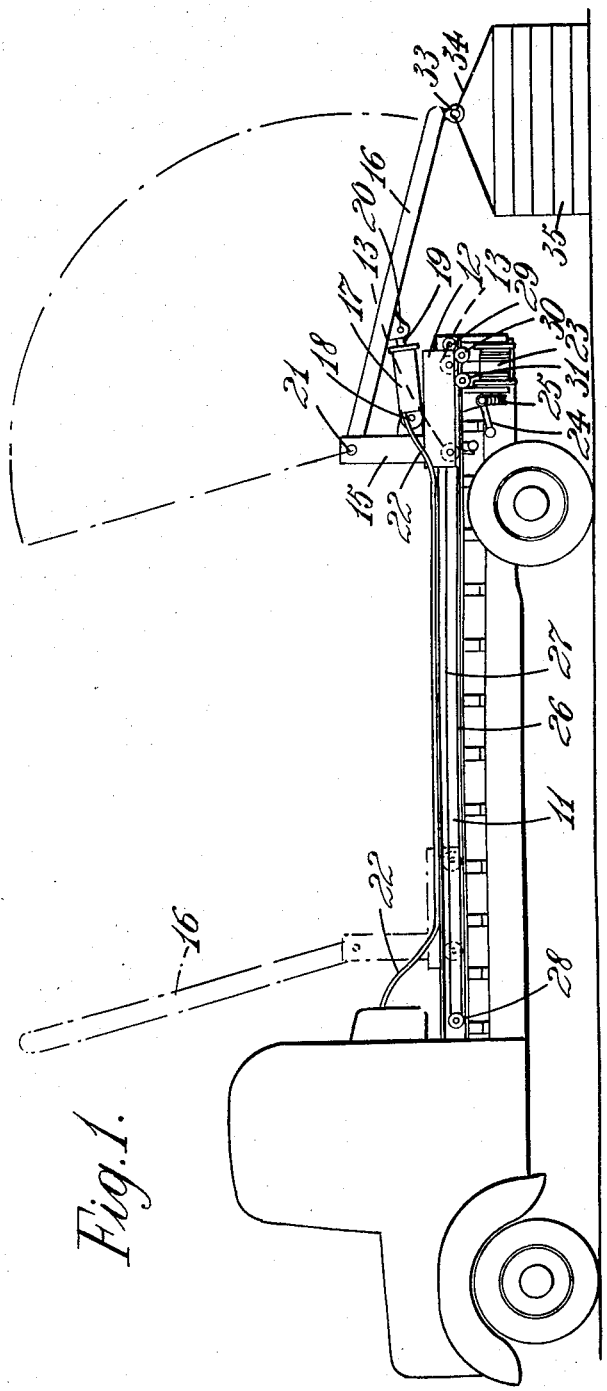

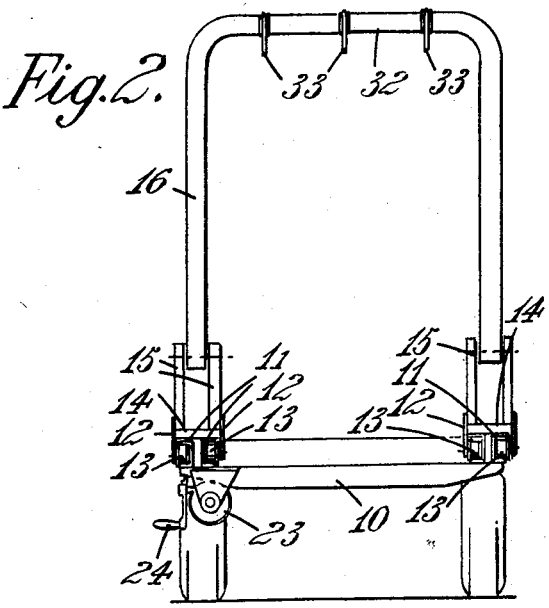
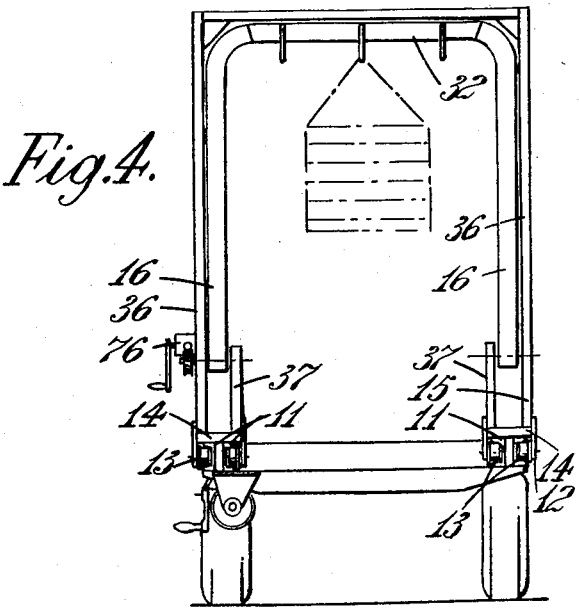

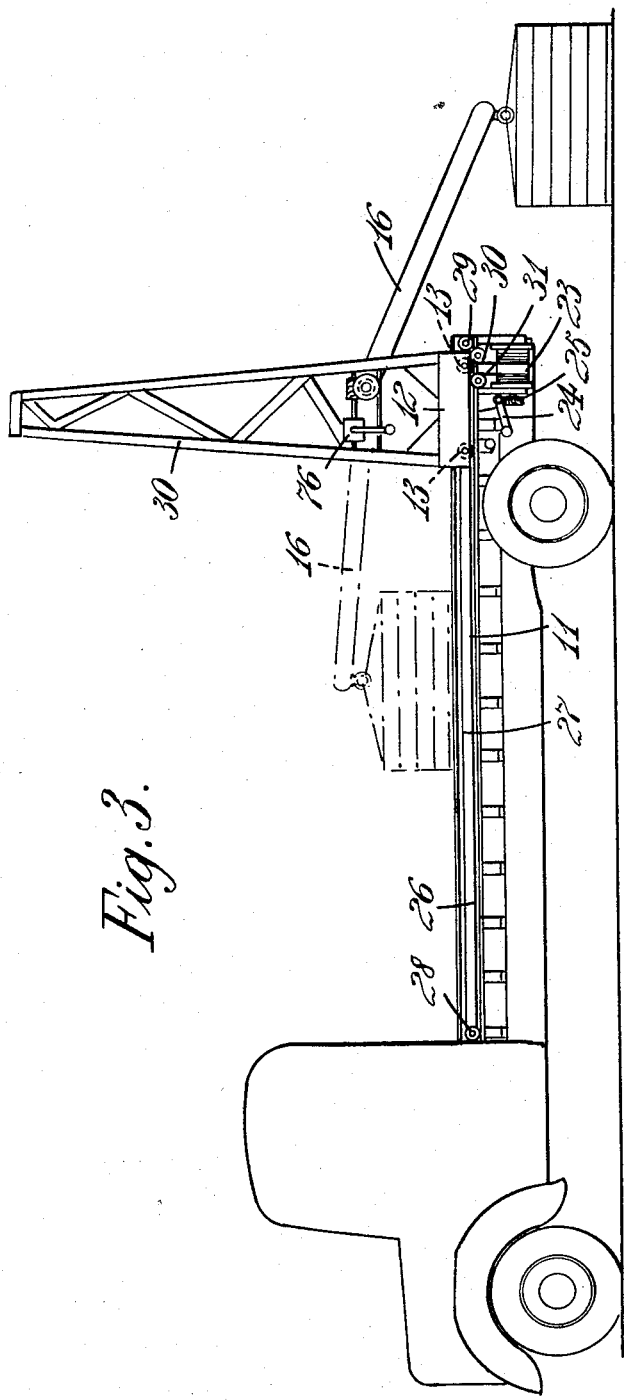

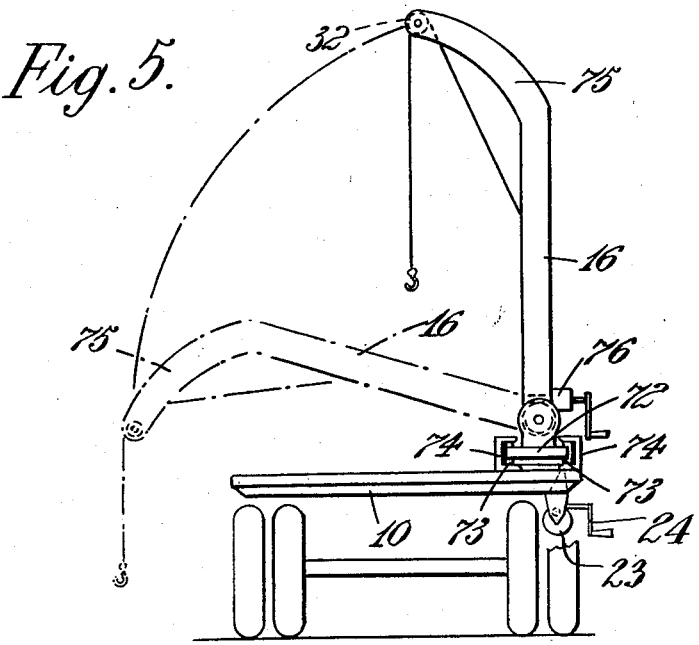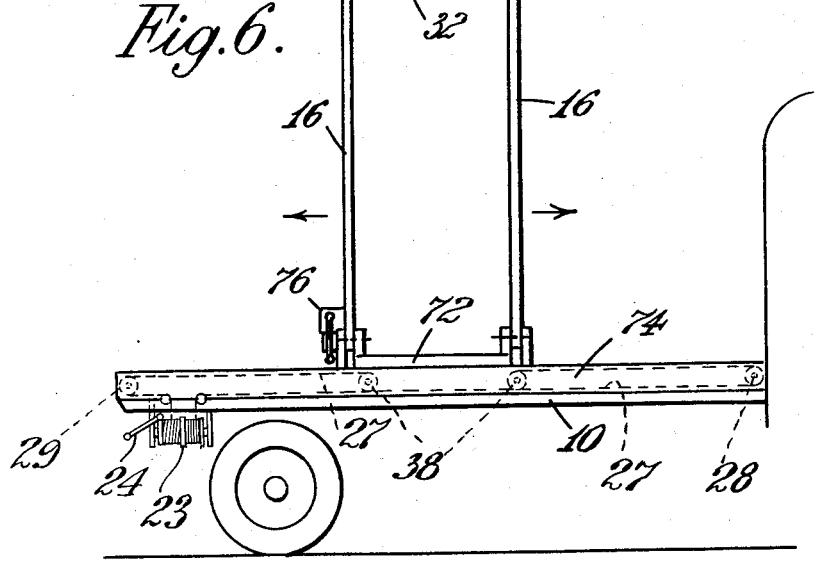

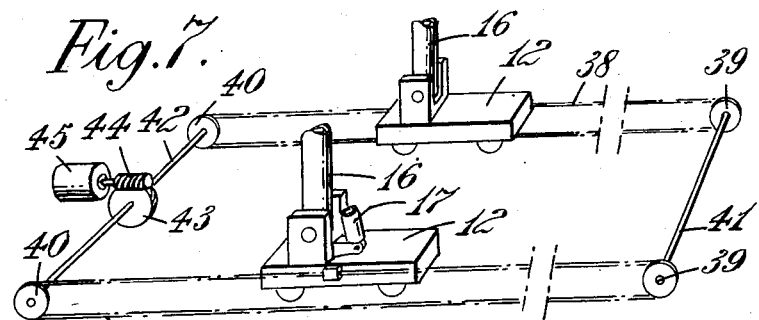
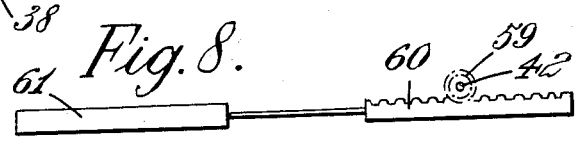
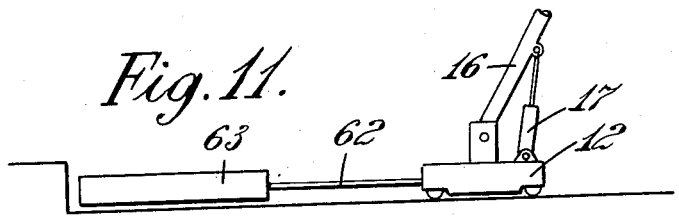
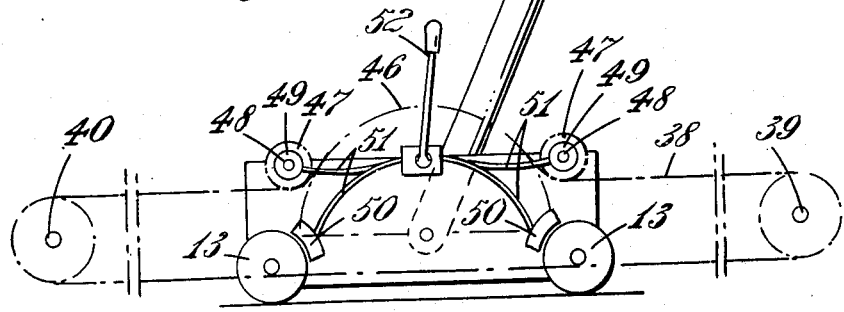

United States Patent Office 2,911,118
Patented Nov. 3, 1959

2,911,118

LOADING AND UNLOADING APPARATUS CARRIED BY VEHICLES

Raymond Percy James Tapp, London, England, assignor to Market Transport Limited, London, England, a British company Application November 23, 1956, Serial No. 623,970

Claims priority, application Great Britain November 22, 1955

6 Claims. (Cl. 214—77)

This invention relates to loading and unloading apparatus carried by vehicles and has for an object to enable goods to be lifted from the ground and then lowered onto the floor of the vehicle at any required locality or vice versa. The term "vehicle" is intended to include a commercial road vehicle, trailer or rail truck.

According to this invention a loading and unloading apparatus carried by a vehicle comprises a supporting structure having wheels arranged to engage at least one track on the vehicle, a lifting gear mounted on said supporting structure so as to be capable of extending outboard of the vehicle and having a part connectable or engageable with the goods to be loaded or unloaded means for imparting a translatory movement to the supporting structure along said tracks and means for imparting up and down movement to said part of the lifting gear.

The aforesaid lifting gear may comprise a cantilever structure mounted at one end on said supporting structure or part secured thereto so as to swing in an up and down direction and at the other end provided with said means for connection or engagement with the goods to be loaded or unloaded.

The supporting structure may comprise two trolleys mounted respectively on two tracks on opposite sides of the vehicle with or without a cross member connecting the trolleys together. The cross member may be arch shaped with its lower extremities secured to said trolleys, and the aforesaid lifting gear, is so arranged as to be capable of moving goods which it supports through the arch from one side to the other thereof.

The swinging cantilever structure may comprise a U shaped member having the extremities of its limbs pivoted to said trolley or trolleys.

In the case where an arch shaped member is provided the extremities of the limbs of the U shaped cantilever structure are pivoted at or near the lower extremities of arch shaped cross member or to parts secured thereto so that the U shaped member may pass through the arch shaped cross member from one side to the other thereof.

It is found in practice that the angular extent of movement of said U shaped member should be at least 105° on one side of the vertical and 15° on the other side.

The aforesaid tracks may comprise rails which are secured to the floor of the vehicle close to the sides thereof and the aforesaid swinging cantilever structure is arranged to swing about an axis transverse to the fore and aft axis of the vehicle. Such an arrangement is suitable for loading and unloading from the rear of the vehicle in which case the limbs of the U shaped member may be straight.

Alternatively the cantilever structure may be mounted on a single trolley or two interconnected trolleys which engage a trackway extending along one side of the vehicle and cantilever structure pivots about a fore and aft axis.

This latter arrangement is suitable for use with an open topped vehicle and the arms of the aforesaid U shaped member are so shaped that they may extend over and beyond the side of the vehicle and then in a downward direction.

In this latter arrangement the rails and wheels may be dispensed with and upstanding brackets may be fixed to the floor of the vehicle on a central fore and aft line and the limbs of the U shaped cantilever arms may be pivoted to the upper ends of the brackets which may also carry the elevating and lowering gear.

The aforesaid swinging cantilever structure may be provided with a sling for carrying the goods to be loaded or unloaded or with a block and tackle mechanism, so that lifting and lowering movement may be applied to the block and tackle mechanism in addition to the lifting and lowering movement provided by the swinging cantilever structure.

In any of the arrangements referred to above movement may be imparted to the supporting structure by cable mechanism operated by a motor or by hand or directly by a hydraulic ram or by a hand operated or power operated screw jack mechanism, rack and pinion mechanism or by driving the supporting wheels.

Movement may be imparted to the lifting gear through a transmission either operated by hand or by a power unit such as a hydraulic ram.

The following is a more detailed description of a number of alternative forms of the invention, reference being made to the accompanying drawings in which:

Figure 1 is a side elevation of a lorry fitted with a loading and unloading apparatus which is traversed by cable mechanism along the vehicle, Figure 2 is a rear elevation of the arrangement shown in Figure 1, Figure 3 is a similar view to Figure 1 of an alternative form of mounting for the loading and unloading apparatus, Figure 4 is a rear elevation of the arrangement shown in Figure 3, Figure 5 is a diagrammatic rear elevation of a lorry fitted with an alternative form of mounting for the loading and unloading mechanism for operating over one side of the lorry, Figure 6 is a diagrammatic side elevation of the arrangement shown in Figure 5, Figure 7 is a diagrammatic perspective view of an alternative form of traversing mechanism for the loading and unloading apparatus, Figure 8 is a diagrammatic view of alternative operating mechanism for the traversing gear of Figure 7, Figure 9 is a side elevation of a combined traversing mechanism and mechanism for raising and lowering the load supporting member, Figure 10 is a diagrammatic perspective view of yet another form of traversing mechanism, Figure 11 is a diagrammatic side elevation of a hydraulic ram traversing mechanism, Figure 12 is a diagrammatic side elevation of a traversing mechanism in which the driving motor is mounted on a trolley which supports the loading and unloading mechanism, and Figure 13 is a rear elevation of an alternative form of mounting for the driving motor.

Like reference numerals refer to like parts in the various figures of the drawing.

The arrangements shown in Figures 1 to 4 are suitable for a lorry having an open flat platform. In the arrangements shown in Figures 1 and 2 there is secured to the platform 10 along each side edge, two channel section members 11 arranged back to back with their flanges extending away from one another.

A trolley is made up from two plates 12 which are arranged on opposite sides of the two channels 11 and each plate has rotatably mounted upon it two rollers 13 spaced apart in a fore and aft direction and engaging the lower flange of one of the channel shaped members. The two plates are secured together by a cross member 14 disposed above the two channels and extending upwardly from the forward part of the cross member are two spaced uprights 15, thus as viewed in side elevation, there is provided an L shaped trolley. Pivoted at 21 between each pair of upright members is one limb 16 of a U shaped cantilever structure which can thus swing in an up and down direction about a transverse axis. This movement is imparted to it by hydraulic rams 17 (shown in Figure 1 but omitted from Figure 2) the cylinder of each of which is pivoted at 18 to one of the trolleys and the piston rod 19 of the ram is pivoted at 20 to the limb 16 of the U shaped structure at a distance away from its pivotal attachment 21 to the trolley. The hose 22 supplying the hydraulic pressure to the rams is stored on a reel (not shown) at the front of the lorry which hose is played in and out as the trolley moves along the aforesaid rails. Movement is imparted to the trolleys by a winch 23 operated by a hand crank 24 and gear transmission 25 all mounted beneath the rear end of the lorry platform. The winch is encircled by a number of turns 26, 27 of an endless cable which pass around pulleys 28, 29, 30, 31 at the front and rear of the platform on each side thereof, two of the stretches 27 of the cable being secured respectively to the two trolleys.

The part 32 of the U shaped cantilever structure which connects together the two limbs 16 may be provided with three lifting points 33 spaced apart each of which may have secured to it a sling 34 by which the articles 35 may be raised from the ground at the rear of the lorry and then raised by swinging the U shaped cantilever structure upwardly part a vertical position on the vehicle, whereafter the trolleys may be traversed along the rails by manipulation of the winch and the articles lowered at the selected points on the platform. With this arrangement the two trolleys are independently mounted. The winch instead of being driven by a hand crank may be driven by a motor such as an electric motor or hydraulic motor.

In an alternative arrangement, the two trolleys 12 are connected together by a vertical arch shaped structure the limbs 36 of which may be fixed to the cross members 14 extending between the plates 12 flanking the channel section members 11. The limbs 36 of the arch shaped structure may be built up from lengths of angle section in the form of an openwork girder and the limbs 16 of the U shaped cantilever structure may each be pivoted to the inner side of the openwork girder and also to an upstanding member 37 secured to the cross member 14 between the plates. Thus the U-shaped cantilever structure 16, 32 may swing within the arch shaped structure.

The trolleys may be traversed by cable and winch mechanism as described with reference to Figures 1 and 2.

In either of the arrangements, instead of the rails 11, for the trolley being secured to the upper side of the platform, they may be disposed beneath the platform and the upstanding members to which the cantilever structure is pivoted may extend downwardly beyond each side edge of the platform and may be provided with inwardly extending portions on which said wheels are mounted, thus leaving the whole of the platform clear.

In the arrangement shown in Figures 5 and 6 the U shaped cantilever structure comprising the limbs 16 and cross member 32 is mounted on a trolley 38 or on two interconnected trolleys provided with rollers 73 engaging the upper and lower flanges of two channel shaped rails 74 extending along one side only of the fixed platform 10. The upper extremities of the limbs 16 are curved at 75 and are of such a length as to extend beyond the opposite side of the platform 10 as shown by the dotted lines. The arm 16 may be swung about a fore and aft axis by a hand operated gearing 76. The interconnected trolleys 38 may be moved along the platform 10 by mechanism similar to that described with reference to Figure 1 and comprising a winch 23 operated by a hand crank 24, which winch is encircled by the two ends of a cable 27 which passes around pulleys 28 and 29 at the ends of the platform 10 and is connected to the trolleys 38. Such an arrangement is equally applicable to an open topped lorry having sides extending up from the platform in which case the curved ends 75 may be of greater length.

In an alternative arrangement shown in Figure 7, two separate endless chains 38, are disposed along opposite sides of the vehicle platform 10 and encircle sprocket wheels 39 and 40. The sprocket wheels 39 are fixed to a cross shaft 41 and the sprocket wheels 40 are fixed to a cross shaft 42 to which is fixed a worm wheel 43. The worm wheel is engaged by a worm 44 driven by a motor 45. The motor may be electrically or hydraulically energised. One stretch of each chain 38 is secured to one of the trolleys 12 to which one arm 16 of the U-shaped member is pivotally attached.

Instead of the shaft 42 being driven by a worm gear it may have fixed thereto a pinion 59 which is engaged by a reciprocable rack 60 driven by a hydraulic motor 61 as shown in Figure 8.

In the arrangements shown in Figure 9 instead of a stretch of each chain 38 being positively fixed to the trolley, it is arranged to encircle an arcuate toothed rack 46 fixed to one of the arms 16 of the U-shaped member and to pass around sprocket wheels 47 mounted on shafts 48 fixed against rotation on the trolley 12. A clutch 49 is provided between each sprocket wheel 47 and the fixed shaft 48. With this arrangement assuming the clutches are engaged, each trolley will be traversed by the upper stretch of each chain 38. On the other hand should the clutches be disengaged the toothed arcuate rack 46 will be rotated relatively to the trolley and swinging movement will be imparted to the arms 16. During this time movement of each trolley may be prevented by brake blocks 50 which engage the trolley wheels 13, which brakes may be applied by the clutch control mechanism which is indicated diagrammatically by the cable controls 51 and lever arm 52. Instead of the wheels being arrested by brake blocks they may be positively clutched and unclutched from the trolley 12.

In the construction shown in Figure 10 two lead screws 53 extend along opposite sides of the vehicle platform and each of them engage nut mechanisms in one of the trolleys 12 on which an arm 16 of the U-shaped member is pivotally mounted. Each lead screw at one end has secured to it a sprocket wheel 54 and the two sprocket wheels are encircled by an endless chain 55. One stretch of the chain is engaged by a further sprocket wheel 56 mounted on a shaft 57 of a driving motor 58.

In the arrangement shown in Figure 11 each trolley 12 is connected to the plunger 62 of a ram 63.

In all the arrangements referred to above, the motor for driving the trolleys is mounted on a fixed part of the chassis.

In Figure 12 a driving motor 64 is mounted on each trolley 12 or on a member joining the two trolleys and is arranged to drive a shaft 65 to which is fixed a pinion 66 in engagement with a rack 67 fixed on each side of the vehicle platform. The rack and pinion may be in the form of a chain and sprocket wheel. Again in this instance the motor may be electrically energised or hydraulically energised or may comprise a hand operated gear.

In Figure 13 the trolleys 12 (only one of which is shown) supporting the arms 16 of the U shaped cantilever structure are each provided with a motor 64 which drives a sprocket 68. The sprocket is encircled by a chain 69 which also encircles a sprocket 70 fixed to a shaft 71 which drives one of two pairs of wheels 13. When the cantilever is in a position outboard of the vehicle the loading on the trolley will be such as to maintain its wheels in contact with the lower flange of the channel 11. When it swings beyond the dead centre the wheels will engage the upper flange. The motor is a reversible one and a reversing switch 77 in circuit therewith is actuated by a trigger 78 on the arm 16.

As described with reference to Figure 1 the up and down swinging movement may be imparted to the U shaped cantilever structure by a ram. Alternatively the limbs of the U may be provided with trunnions to at least one of which is fixed a gear wheel which may be rotated through a suitable transmission by a motor or by a hand crank indicated diagrammatically at 76 in Figures 3 and 4.

In any of the arrangements referred to above the cross member 32 of the U shaped swinging cantilever structure is either provided with a sling for carrying the goods to be loaded or unloaded or is provided with block and tackle mechanism so that lifting and lowering movements may be applied to the goods in addition to the movement provided by the swinging of the cantilever structure. Also in any of the arrangements referred to above the U shaped cantilever structure may be formed from light tubular or rolled steel elements.

In the case where a hydraulic ram is employed high pressure self coiling hose may be provided in order to accommodate for the movement of the supporting structure.

In the case where an arch shaped cross member is employed to which the swinging cantilever structure is connected, it may be practicable to dispense with the rails and supporting wheels. In which case the arch shape structure is rigidly fixed to the floor of the vehicle towards the rear end thereof and the fact that a swinging cantilever structure may pass through the arch shape structure from one side to the other it is possible to lower the goods or to lift the goods from any portion of the floor particularly if a sling or block and tackle mechanism is provided on the swinging cantilever structure. In such an arrangement the extent of swing should be about 180°. A fixed arch of this kind is also applicable to an arrangement in which the swinging cantilever structure is arranged to swing about an axis parallel to the fore and aft axis of the vehicle and in which the cantilever structure is so shaped as to be capable of reaching over a load to pick up goods from the ground.

I claim:

1. A loading and unloading apparatus carried by a vehicle comprising rails extending along the floor of the vehicle in a fore and aft direction on each side thereof, a trolley on each rail, an arch-shaped structure fixed between said trolleys, a U-shaped structure having each of its limbs pivoted on the inside of the side members of said arch-shaped structure adjacent the lower ends thereof, which arch-shaped structure is wider in span and greater in height than the U-shaped member so that the latter may move from one side to the other of the former, means for imparting fore and aft translatory movement to said structure and means on the cross-member of the U-shaped structure for engaging the goods to be lifted.

2. A loading and unloading apparatus carried by a vehicle comprising rails extending along the floor of the vehicle in a fore and aft direction on each side thereof, a trolley on each rail, a U-shaped supporting structure having each of its limbs pivotally connected to one of the trolleys, a driving mechanism wholly mounted on at least one trolley and adapted to impart up and down swinging movement to said U-shaped supporting structure and means for imparting fore and aft translatory movement to said structure comprising an endless chain extending in a fore and aft direction having one of its stretches secured to said trolley, which endless chain is supported by two spaced sprocket wheels, one of which is driven by a motor, and means on the cross-member of the U-shaped structure for engaging goods to be lifted.

3. A loading and unloading apparatus carried by a vehicle comprising rails extending along the floor of the vehicle in a fore and aft direction on each side thereof, a trolley on each rail, a U-shaped supporting structure having each of its limbs pivotally connected to one of the trolleys, a driving mechanism wholly mounted on at least one trolley and adapted to impart up and down swinging movement to said U-shaped supporting structure and means for imparting translatory movement to said trolleys comprising a hand-driven winch and a cable system having two stretches extending along each side of the vehicle, one of which stretches is connected to said trolley and the other of which stretches is connected to a part of the drum of the winch and means on the cross-member of the U-shaped structure for engaging goods to be lifted.

4. A loading and unloading apparatus carried by a vehicle comprising rails extending along the floor of the vehicle in a fore and aft direction on each side thereof, a trolley on each rail, a U-shaped supporting structure having each of its limbs pivotally connected to one of the trolleys, a driving mechanism wholly mounted on at least one trolley and adapted to impart up and down swinging movement to said U-shaped supporting structure and means for imparting fore and aft translatory movement to said structure comprising hydraulic rams having movable parts attached to the trolleys and means on the cross-member of the U-shaped structure for engaging goods to be lifted.

5. A loading and unloading apparatus carried by a vehicle comprising rails extending in a fore and aft direction along both sides of the floor of the vehicle, a single trolley supported by said rail, a U-shaped supporting structure having each of its limbs pivotally connected to said trolley above said rails, a driving mechanism mounted on the trolley and adapted to impart up and down swinging movement to said U-shaped structure and means for imparting translatory movement to the trolley comprising a motor mounted and driving a shaft to which the wheels of the trolley are attached.

6. A loading and unloading apparatus carried by a vehicle comprising a U-shaped supporting structure having each of its limbs pivotally connected to a trolley, a rail system supporting said trolley and extending along one side of the vehicle in a fore and aft direction, a driving mechanism adapted to impart up and down swinging movement to said U-shaped structure about a fore and aft axis, means for imparting fore and aft translatory movement to said structure, and means on the cross-member of the U-shaped structure for engaging the goods to be lifted.

References Cited in the file of this patent

UNITED STATES PATENTS

| 1,052,096 | Schulze | Feb. 4, 1913 |
| 2,386,216 | Hay | Oct. 9, 1945 |
| 2,437,806 | Dempster | Mar. 16, 1948 |
| 2,746,619 | Kuhlenschmidt et al. | May 22, 1956 |
| 2,758,730 | Tapp et al. | Aug. 14, 1956 |